V. E. BEAGLE.
HOISTING TRUCK.
APPLICATION FILED NOV. 17, 1915. RENEWED AUG. 29, 1919.
1,364,234.
Patented Jan. 4, 1921.
4 SHEETS—SHEET 4.
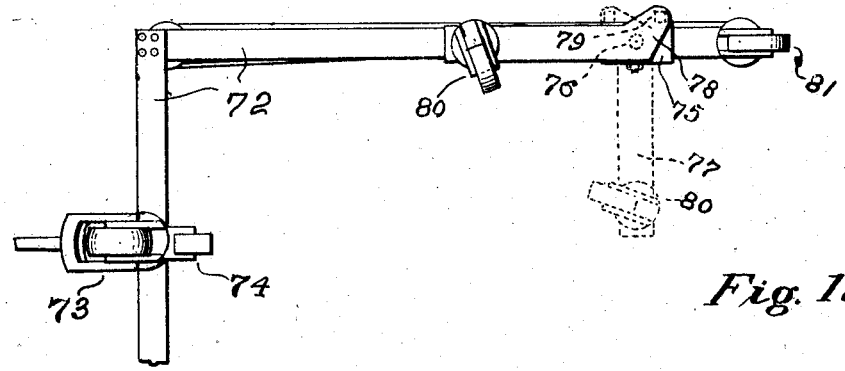
*Fig. 12.*
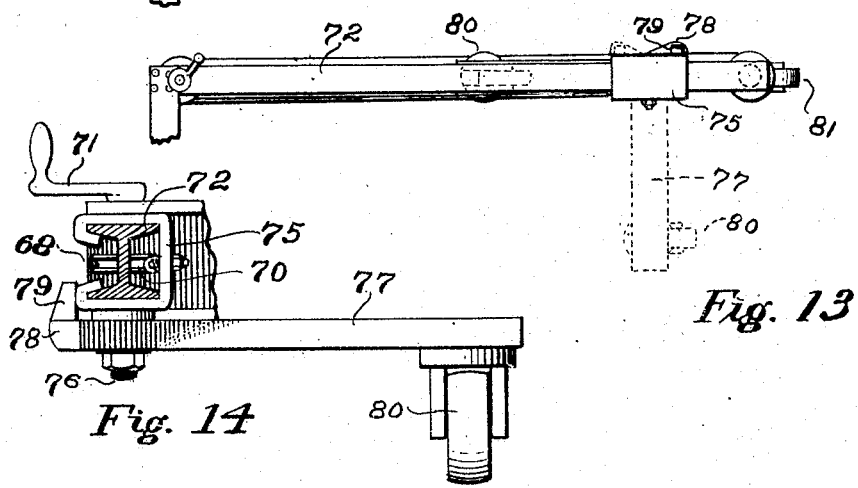
*Fig. 13.*
*Fig. 14.*
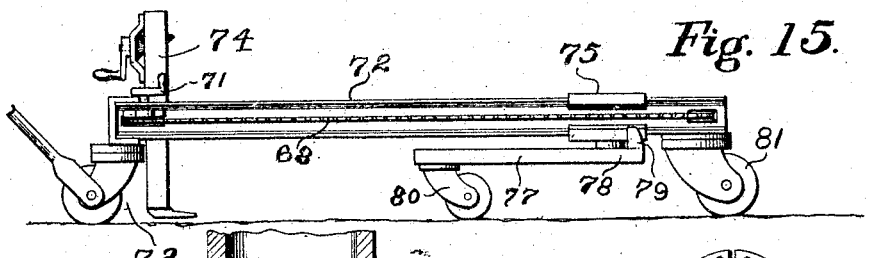
*Fig. 15.*
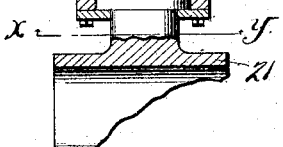
*Fig. 16.*
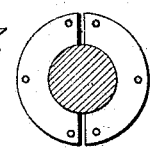
*Fig. 17.*
Witnesses
Chv. Nielsen Jr.
O. N. Woodward
Inventor
V. E. Beagle,
By H. Woodward
Attorney

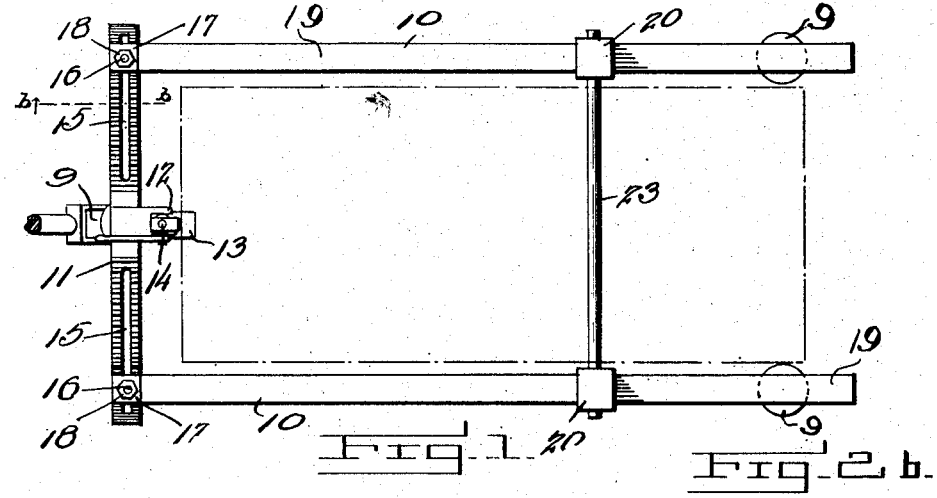
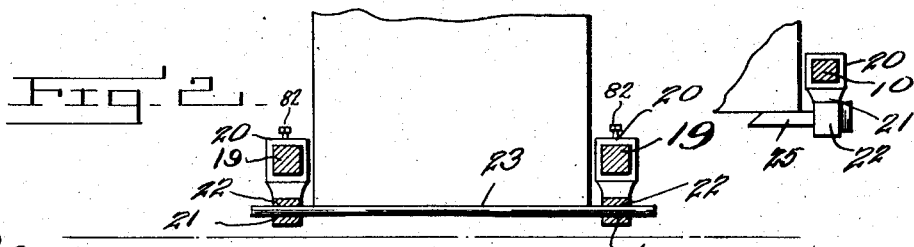
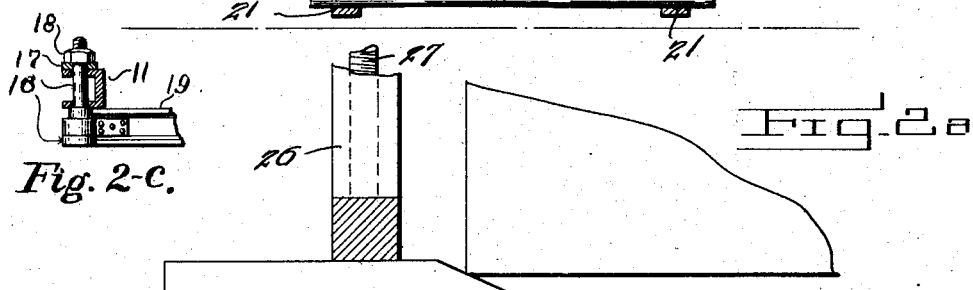
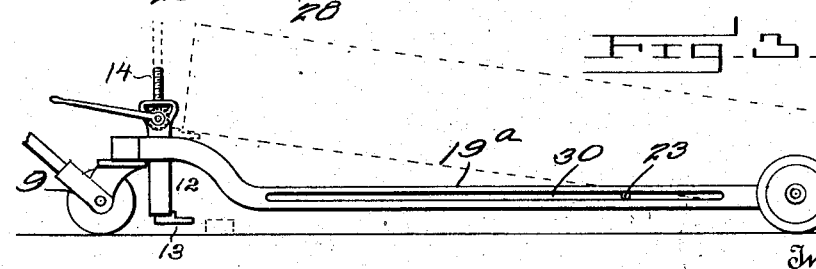

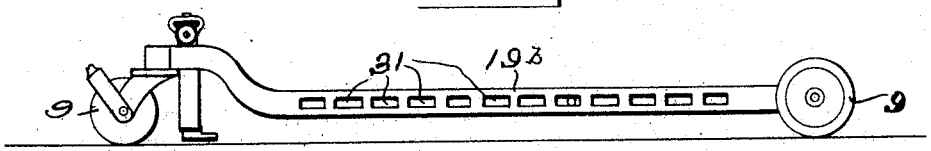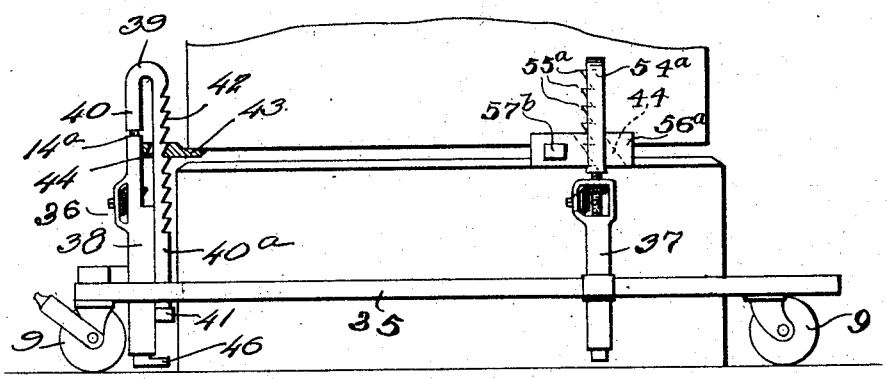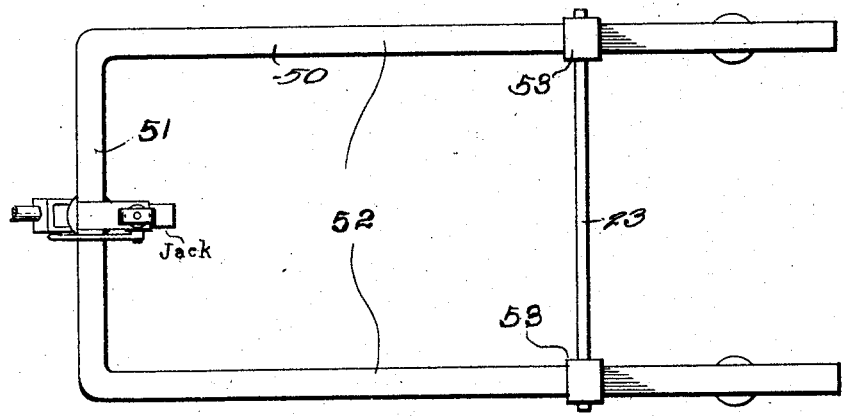

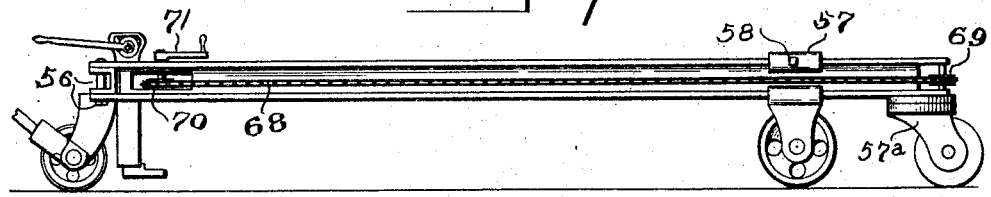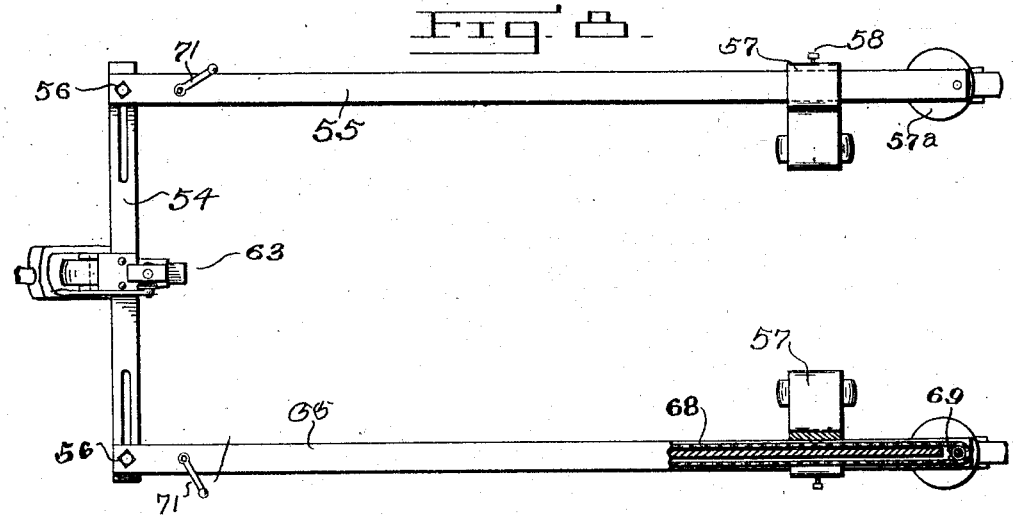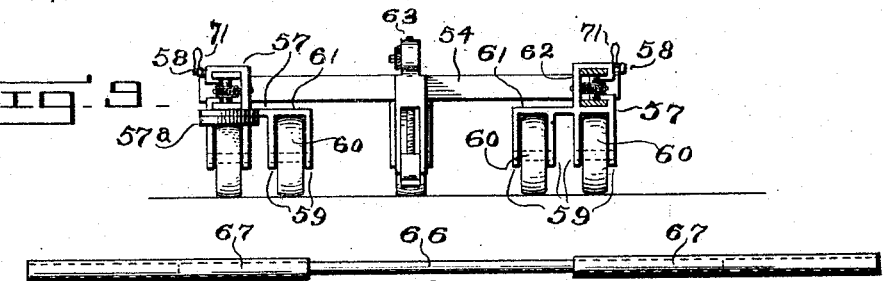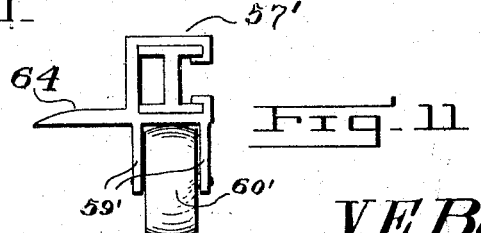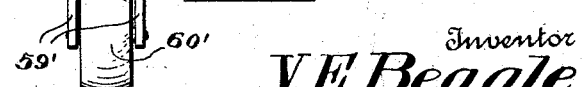

UNITED STATES PATENT OFFICE.

VICTOR E. BEAGLE, OF BINGHAMTON, NEW YORK.

HOISTING-TRUCK.

1,364,234. Specification of Letters Patent. Patented Jan. 4, 1921.

Application filed November 17, 1915, Serial No. 61,953. Renewed August 29, 1919. Serial No. 320,694.

*To all whom it may concern:*

Be it known that I, VICTOR E. BEAGLE, a citizen of the United States, residing at Binghamton, in the county of Broome and State of New York, have invented certain new and useful Improvements in Hoisting-Trucks, of which the following is a specification.

The invention has for an object the improvement of the construction of trucks such as illustrated in my copending application Serial No. 28,370, 1915, and has for an object to simplify and cheapen the construction of the truck while retaining its advantages for the various uses contemplated. A particular object is to obviate the necessity for as many jacks as were indicated in the original construction, for certain uses. Another purpose is to give a means whereby the support of objects over a large part of their surface may be effected, and whereby objects of irregular shapes may be engaged for lifting, with facility. It is also an important object to give a rapid and ready means for engaging a lifting support beneath a body to be raised. It is an advantage of this construction that it permits the raising of large bodies such as stones, boxes, and other objects—especially those of elongated form—by the manipulation of only a single jack.

An aim of the invention is to simplify the construction of the truck frame, in order that it may be readily adjusted to the work. A further important aim is to increase the safety with which objects are held on such a truck after being raised by jacks.

A still further aim is to give such a truck and appliances adapted to raise the upper of a number of superposed pieces, as for instance, to lift a monument from its base, or to lift a piece of work from an elevated support.

Additional objects, advantages, and features of my invention may appear from the description and drawings herein, Figure 1 of the drawings being a plan of one embodiment of the truck, Fig. 2 is a cross sectional detail of such a truck and a work engaging means, Fig. 2ᵃ is a detail of a modified jack foot, Fig. 2ᵇ is a detail of a modified work rest on the frame, Fig. 2ᶜ is a detail of the head construction, Fig. 3 is an elevation of a further embodiment of the truck, Fig. 4 is a similar view of a still further form of truck, Fig. 5 is a similar view of an additional modification, Fig. 6 is a plan of a different form of truck frame, Fig. 7 is an elevation of another embodiment of the truck, Fig. 8 is a plan thereof, Fig. 9 is a rear view thereof, partly in section, Fig. 10 is a detail of an extensible rear cross bar, Fig. 11 is a detail of a rear sliding truck element, Fig. 12 is a fragmentary plan of another form of truck element, Fig. 13 is a similar top view thereof, Fig. 14 is a detail elevation thereof, Fig. 15 is a side elevation thereof.

Fig. 16 is a detail section of the swivel mounting for the element 21,

Fig. 17 is a similar view thereof on the line *x—y* of Fig. 16.

There is illustrated a truck 10, comprising a head piece 11 mounted upon a wheel 9 in any suitable manner, and having a jack 12 centrally thereof the lifter foot 13 of which projects rearwardly for engagement beneath work. The jack may be of any suitable construction, and as shown includes the usual screw 14. The ends of the head are slotted as at 15, and engaged through these slots there are respective bolts 16 having plates 17 engaged revolubly therearound and clamped against the properly serrated upper side of the head piece by nuts 18. The bolts are enlarged beneath the head piece and have pivoted thereon side pieces 19 of proper construction, supported by suitably mounted wheels at the rear part. These side pieces are rectilinear steel beam sections of desirable form, and have slidably secured thereon respectively one or more sliding blocks 20, each having a downwardly extending portion 21 having a transverse passage 22 therethrough in which a cross bar 23 is slidably engaged. As shown the downwardly extending portion of the sliding members is formed in two parts, having a swivel connection, the part having the passage 22 therethrough being the lowermost one and being revoluble for purposes to be described. The connection may be made in any well known way, which will be well understood by those versed in such construction. Bars 23 of various lengths may be used to suit various adjustments of the side pieces.

In the use of this form of the truck, the bar 23 being removed, the side pieces of the frame are separated sufficiently and the frame adjusted around the work with the foot 13 in position to lift the work at the side adjacent the head piece. The nuts 18 may be tightened after the sides are properly adjusted and before the jack 12 is operated to lift the work. The foot being properly positioned, the jack is operated to lift the adjacent side of the work as far as desired, and after being hoisted until the lower part of the work is raised above the level of the passages 22 as far toward the rear of the center of the work as possible, the blocks 20 are slipped forwardly of this point and the bar 23 inserted therethrough, after which they are forced backward on the side pieces until the bar engages snugly against the underside of the work. The jack 13 is then operated to lower the forward part of the work, until its rear part has cleared the ground as far as desired, after which the truck may be moved, carrying the work.

In Fig. 2$^b$ the construction of the truck is largely the same as in Fig. 1, and the slide blocks are made either in one piece or with the lower part swiveled as described. In place of the bar 23, however, sliding pins 25 are slidably mounted in each block adapted to be withdrawn to entirely clear the space between the side pieces of the frame, and after the truck has been adjusted around the work they are forced in, after raising of the forward part of the work. In Fig. 2$^a$, there is illustrated the lower part of a jack 26, the screw element 27 of which is without a foot piece such as is ordinarily provided in such devices, and instead has a suitable transversely apertured block 28 at the lower end, through which there is adapted to be driven a wedge 29 equivalent to the foot piece, and by which the lifting of many objects not adapted to be raised by the previously described method is made possible.

In Fig. 3 there is illustrated a simple method of attaining the longitudinal adjustment of the cross bar 23 in the frame, the construction of the parts being otherwise as already described. Here, the side pieces 19$^a$ are formed with longitudinal slots 30 therethrough from side to side, and the bar 23 is simply rested in the slots. A number of bars 23 may thus be engaged beneath a piece of work, which will safeguard material of a character which would be liable to fracture by strains incident to its weight and the jars occurring in transportation.

Fig. 4 shows another adaptation of the same principle of construction, the side pieces 19$^b$ being provided with a multiplicity of longitudinally spaced openings 31 through which the bar or bars 23 may be inserted, the construction otherwise being adapted from the disclosures elsewhere made in this application, or indicated.

Fig. 5 represents a construction of the device wherein, in addition to being adapted to lift objects resting upon the ground, it is applicable to the raising of bodies by engagement therewith at points above the level of the jack bodies.

In this instance the truck frame 35 is provided with a forward jack 36 and adjustable jacks 37 on the side pieces of the frame. The jack construction which may be of some such type as already indicated, is shown including screws 14$^a$ of ordinary form carried in the usual guide body 38, in each instance. On each jack there is an extension piece 39 in the form of an inverted letter J, the short arm 40 of which is formed with a socket in the end shaped to receive the upper end of the screw 14$^a$ revolubly, for support of the extension. The long arm of the extension projects downwardly to a point near the lower part of the guide 38 when the screw is in initial position and engaged in the arm 40. The extremity of the long arm 40$^a$ is provided with a cross arm 41 sliding upon the inner face of the guide and at its upper part the arm is formed with a series of upwardly directed teeth 42 upon which there engages an adjustable foot piece 43 formed with a diagonal passage 44 therethrough having such relation to the body of the foot that when the inwardly projecting portion 45 of the foot is raised the foot may be slipped over the teeth but when disposed horizontally, its lower inner side engages on one of the teeth 42 while its upper outer side bears against the side of the arm 40$^a$ opposite the teeth, and holds the foot in secure engagement with the teeth. These teeth extend from the upper part of the extension piece to a point closely adjacent the uppermost level to which the lower foot 46 of the jack may be raised, as found desirable. This permits the foot 43 to be adjusted to engage pieces of work at points above the range of the regular foot of the jack. When not in use the extension may be lifted off and hung upon any suitable support.

The rear jacks on the frame in the last described form of the truck are equipped with extensions 54$^a$ having teeth 55$^a$ at the front side instead of toward the work, and the adjustable pieces 56$^a$ thereon extend forwardly over the sides of the frame and have transverse apertures 57$^b$ therethrough adapted to receive either the bar 23 or the sliding wedges or foot pieces.

By the use of the cross bar 23 and the sliding foot piece 29, it is possible to use a frame 50 of rigid U-shaped construction as shown in Fig. 6, where the head 51 and sides 52 of the truck frame are formed integrally from one piece of channel iron upon which there may be slidably engaged either form of sliding blocks first described, or the slidably adjustable jack having the retractable foot piece, also previously described, the corresponding device being formally shown at 53.

In Figs. 7 to 9 there is illustrated a means for adjusting the rear support on the truck, and also a desirable construction in the support, combined with the rear wheels, whereby the wheels will be located immediately adjacent the point of support of the load at the rear. In this construction the frame is provided with a cross piece 54, longitudinally slotted at each end, and side stringers 55 are pivotally connected thereto in a suitable manner, as by means of the bolt and nut 56, as shown. The cross piece is shown as formed of ordinary channel iron, while the side stringers are illustrated as formed from standard I beams. The rear supports comprise truck elements 57, each having an upper part shaped with a passage conforming to the shape and size of the I beams, and receiving an I beam therethrough. It may be held in adjusted position by any suitable means as for instance a set screw 58 engaged therethrough and arranged to bear against the stringer. The lower part of each of these truck elements includes double forks 59, between which there are mounted parallel wheels 60, one being located directly beneath the I beam, while the other is located a distance inwardly thereof, a shelf portion or rest 61 being formed thereover upon which a load to be carried by the truck may be rested. This rest is located below the major portion of the truck body, so that a shoulder 62 is formed at the outer side thereof closely adjacent the I beam stringer, whereby the load will be held against slipping laterally. This type of truck is particularly adapted to use in hauling rectangular blocks of stone and the like, the size being adjusted so as to pass on each side of the block when the device is positioned for loading, the jacks 63 at the forward end thereof being utilized to lift the forward end of the load, after which the truck portions are moved inwardly to engage under the rear portion, and the jack 63 then operated to lower the forward end, which results in raising the rear end of the load from the ground. The jack 63 is of some such construction as that previously described in the other form of the truck in a similar situation. Casters 57$^a$ may be pivoted on the rear ends of the stringers 55.

For adjusting the sliding trucks 57 an endless chain 68 is engaged around suitable sprockets 69 and 70 at the rear and front of each side beam respectively, the latter being operable by a crank 71. Each chain is attached to the respective adjacent truck in a suitable manner whereby operation of the cranks 71 will move the truck elements.

In Fig. 11 there is shown a further modification of the sliding truck construction, in which the upper portion 57' is constructed approximately in the same form as that 57 before described, and but one set of forks 59' are formed on the lower side of the truck, in which the wheel 60' is suitably mounted. On the inner side of the truck body an arm 64 is projected horizontally inward, of a suitable form to operate in supporting the rear portion of a load as will be readily understood from the previous description.

In Fig. 10 there is illustrated a form of bar 65 to be used in the same manner as the bar 23 before mentioned, the bar 65, however, comprising one central piece 66 of small diameter, and two tubular portions 67 of larger diameter snugly and slidably engaged thereon, so that the bars may be extended or shortened to suit various adjustments of the truck.

In Figs. 12 to 15 there is presented another embodiment of the invention, in which it is made possible to use a rigid frame at the same time that the work is supported on adjustable rear truck elements. In this case the frame 72 includes a front cross piece and side beams rigidly connected, the width of the frame being ample for the bulk of the larger loads contemplated. A guiding caster 73 which may be manually controlled by one of the familiar means, is mounted at the forward end of the frame, as well as a jack 74 similar to those already described for this use. Sliding yokes 75 are mounted on the side beams, and these may be moved by means similar to that immediately before described, if desired. These yokes are each provided with a downwardly projecting pivot pin 76, upon which there is pivoted a beam 77 adapted to lie beneath the side beam in longitudinal parallel relation. The beam 77 is provided with an oblique extension 78 having a check lug 79 thereon located to engage the outer side of the yoke 75 when the beam 77 is at the forward limit of its movement. The lug is so located as to swing away from the yoke as the beam 77 is moved inwardly, and will again strike the yoke when the beam 77 is at right angles to the side beam of the frame. On the lower side of the beam 77 there is a caster 80, and suitable wheels 81 are also mounted in a suitable manner at the rear end of the side beams of the frame 72, casters being illustrated.

In the use of the last described form of the device, the frame is adjusted around the load to be moved with the beams 77 swung forwardly and outwardly sufficiently to clear the load; the jack 74 is used to raise the forward end of the load and the beams 77 are then swung inwardly until the load is properly engaged thereby, after which the jack 74 is operated to lower the front end of the load sufficiently for its rear end to clear the ground, when the truck may be moved with the load thereon.

With the forms of the device shown with sliding rear truck elements, these may be adjusted at the extreme forward end of the frame while the front jack is used to raise the forward end of the load and then moved rearwardly.

No fastening is ordinarily employed to secure the sliding element 20 upon the side members of the frame, as these members have been found to bind upon the side members when a load is rested upon the bar 23, whereby the latter is held against longitudinal movement upon the frame. A set screw has been employed in some cases, however, engaged through the sliding element 20 so as to impinge against the side member of the frame, as indicated at 82, in Fig. 16.

What is claimed is:

1. In a device of the character described, a frame including side pieces connected at one end only to receive work therebetween, slidable elements on the side pieces, swiveled members on the under sides of the slidable elements having passages therethrough, and a bar for engagement through the passages.

2. A frame for trucks of the class described comprising a head piece having longitudinal slots in opposite ends, pivot members longitudinally slidable therein, means to secure the pivot members in adjusted positions, side pieces pivoted on the pivot members, work supporting devices carried by the frame, and wheels supporting the frame.

3. In a device of the character described, the combination of a substantially U-shaped frame, lifting means on the bight portion of said frame, and non-elevating supporting means carried by the sides of the frame and adjustable longitudinally thereon adapted to engage under raised work.

4. A truck comprising a wheeled U-shaped frame, a work supporting bar of a length to extend across the space between the sides of the frame, a lifting device at the closed end of the frame, and means to support the bar at various points in the length of the sides of the frame, whereby a load raised at one part by said lifting device may be lowered upon the bar without longitudinal displacement of the bar.

In testimony whereof I affix my signature in presence of two witnesses.

VICTOR E. BEAGLE.

Witnesses:
CORTLAND WILBER,
H. L. COBURN.